United States Patent
Endoh et al.

(10) Patent No.: US 9,711,817 B2
(45) Date of Patent: Jul. 18, 2017

(54) POLYMER ELECTROLYTE MEMBRANE AND MEMBRANE-ELECTRODE ASSEMBLY FOR POLYMER ELECTROLYTE FUEL CELL

(75) Inventors: Eiji Endoh, Tokyo (JP); Yoshitaka Doi, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 1956 days.

(21) Appl. No.: 11/854,822

(22) Filed: Sep. 13, 2007

(65) Prior Publication Data

US 2008/0118806 A1 May 22, 2008

(30) Foreign Application Priority Data

Nov. 22, 2006 (JP) .................. 2006-316308

(51) Int. Cl.
*H01M 8/1039* (2016.01)
*H01M 8/1025* (2016.01)
*H01M 8/1046* (2016.01)
*H01M 4/88* (2006.01)

(52) U.S. Cl.
CPC ....... *H01M 8/1039* (2013.01); *H01M 8/1025* (2013.01); *H01M 8/1046* (2013.01); *H01M 4/881* (2013.01); *H01M 2300/0082* (2013.01)

(58) Field of Classification Search
CPC ... C07C 309/09; C07C 309/10; C07C 309/11; C07C 309/12; H01M 8/1025; H01M 8/1027; H01M 8/1048; H01M 4/86; H01M 8/1032
USPC ................................. 429/493–494
See application file for complete search history.

(56) References Cited

U.S. PATENT DOCUMENTS

| | | | |
|---|---|---|---|
| 5,491,041 A | | 2/1996 | Abraham et al. |
| 6,689,513 B1 * | | 2/2004 | Morigaki et al. ........ 429/231.95 |
| 2006/0094792 A1 * | | 5/2006 | Colombo et al. ............. 521/27 |
| 2006/0099476 A1 * | | 5/2006 | Watakabe et al. ............. 429/33 |
| 2006/0222920 A1 * | | 10/2006 | Merzougui ......... H01M 8/0291 429/410 |
| 2007/0082248 A1 | | 4/2007 | Lee et al. |
| 2007/0099053 A1 * | | 5/2007 | Frey ...................... C08J 5/2237 429/483 |

FOREIGN PATENT DOCUMENTS

| | | |
|---|---|---|
| EP | 0 854 527 A2 | 7/1998 |
| EP | 1 760 812 A1 | 3/2007 |
| EP | 1 772 919 A1 | 4/2007 |
| JP | 6-103992 | 4/1994 |
| JP | 2001-118591 | 4/2001 |
| JP | 2003-257236 | 9/2003 |
| JP | 2006-99999 | 4/2006 |
| JP | 2006-260811 | 9/2006 |
| KR | 10-2004-0104842 | 12/2004 |
| WO | WO 2005/124911 A1 | 12/2005 |
| WO | WO 2005/124912 A1 | 12/2005 |
| WO | WO 2006/098484 * | 3/2006 |
| WO | WO 2006-080767 * | 11/2006 |
| WO | WO 2007/108949 A1 | 9/2007 |

OTHER PUBLICATIONS

STIC Search Jun. 4, 2014.*
Matsuda et al [Poly(ethylene oxide)-grafted Polymers as Matrices for All-solid Batteries. Polymers for Advanced Technologies. vol. 4, pp. 209-214]. 1993.*
STN Search Mar. 9, 2016.*
Summary of debrief session for polymer electrolyte fuel cells research and development achievement in 2000 sponsored by New Energy and Industrial Technology Development Organization, p. 56, lines 16 to 24.
Darmasena Peramunage, et al., "Poly(crown ether): A Potential Candidate for Solid-State Electrolytes", Macromolecules, vol. 22 No. 6, XP-002086268, 1989, pp. 2845-2849.

* cited by examiner

*Primary Examiner* — Stephen Yanchuk
(74) *Attorney, Agent, or Firm* — Oblon, McClelland, Maier & Neustadt, L.L.P.

(57) ABSTRACT

A polymer electrolyte membrane which comprises a polymer electrolyte having sulfonic acid groups, and contains any one of the following (a) to (c):
(a) cerium ions and an organic compound (X) capable of forming an inclusion compound with cerium ions;
(b) an inclusion compound (Y) comprising the organic compound (X) including cerium ions; and
(c) at least one of cerium ions and the organic compound (X), and the inclusion compound (Y).

41 Claims, No Drawings

POLYMER ELECTROLYTE MEMBRANE AND MEMBRANE-ELECTRODE ASSEMBLY FOR POLYMER ELECTROLYTE FUEL CELL

The present invention relates to a polymer electrolyte membrane for a polymer electrolyte fuel cell, whereby the initial output voltage is high, and the high output voltage can be obtained over a long period of time, and a membrane-electrode assembly having the polymer electrolyte membrane.

A fuel cell is a cell whereby a reaction energy of a gas as a feed material is converted directly to electric energy, and a hydrogen-oxygen fuel cell presents no substantial effect to the global environment since its reaction product is only water in principle. Especially, a polymer electrolyte fuel cell employing a polymer electrolyte membrane as an electrolyte membrane, can be operated at room temperature to provide a high power density, as a polymer electrolyte membrane having high ion conductivity has been developed, and thus is expected to be a prospective power source for mobile vehicles such as electric cars or for small cogeneration systems, along with an increasing social demand for an energy or global environmental problem in recent years.

In a polymer electrolyte fuel cell, a proton conductive ion exchange membrane is commonly employed as a polymer electrolyte membrane, and an ion exchange membrane made of a perfluorocarbon polymer having sulfonic acid groups, is particularly excellent in the basic properties. In the polymer electrolyte fuel cell, gas diffusion type electrode layers are disposed on both sides of the ion exchange membrane, and power generation is carried out by supplying a gas containing hydrogen as a fuel and a gas (such as air) containing oxygen as an oxidizing agent to the anode and the cathode, respectively.

In the reduction reaction of oxygen at the cathode of the polymer electrolyte fuel cell, the reaction proceeds via hydrogen peroxide ($H_2O_2$), and it is worried that the electrolyte membrane may be deteriorated by the hydrogen peroxide or peroxide radicals to be formed in the electrode layer. Further, to the anode, oxygen molecules will come from the cathode through the membrane, and it is worried that hydrogen peroxide or peroxide radicals may be formed at the anode too. Especially when a hydrocarbon polymer membrane is used as the polymer electrolyte membrane, it is poor in the stability against radicals, which used to be a serious problem in an operation for a long period of time.

As opposed to such a hydrocarbon polymer, a perfluorocarbon polymer having sulfonic acid groups as a polymer remarkably excellent in the stability against radicals, has been known. In recent years, a polymer electrolyte fuel cell employing an ion exchange membrane made of such a perfluorocarbon polymer is expected as a power source for e.g. automobiles or housing markets, and a demand for its practical use is increasing, and its developments are accelerated. In such applications, its operation with particularly high efficiency is required. Accordingly, its operation at higher voltage is desired, and at the same time, cost reduction is desired. Further, from the viewpoint of the efficiency of the entire fuel cell system, an operation under low or no humidification is required in many cases.

However, it has been reported that even with a fuel cell employing an ion exchange membrane made of a perfluorocarbon polymer having sulfonic acid groups, the stability is very high in operation under high humidification, but the voltage degradation is significant in operation under low or no humidification conditions (see Non-Patent Document 1). Namely, it is considered that, also in the case of the ion exchange membrane made of a perfluorocarbon polymer having sulfonic acid groups, deterioration of the electrolyte membrane proceeds due to hydrogen peroxide or peroxide radicals in operation under low or no humidification.

Patent Document 1: JP-A-2001-118591
Patent Document 2: JP-A-6-103992
Non-Patent Document 1: Summary of debrief session for polymer electrolyte fuel cells research and development achievement in 2000 sponsored by New Energy and Industrial Technology Development Organization, page 56, lines 16 to 24

Accordingly, for the practical application of a polymer electrolyte fuel cell to e.g. vehicles or housing markets, it is an object of the present invention to provide a membrane for a polymer electrolyte fuel cell, whereby power generation with sufficiently high energy efficiency is possible, high power generation property is achieved, and stable power generation is possible over a long period of time, either in its operation under low or no humidification where the humidification temperature (dew point) of the feed gas is lower than the cell temperature or in its operation under high humidification where humidification is carried out at a temperature close to the cell temperature.

The present invention provides the following polymer electrolyte membrane and the following membrane-electrode assembly using the membrane.

A polymer electrolyte membrane which comprises a polymer electrolyte having sulfonic acid groups, and contains any one of the following (a) to (c):

(a) cerium ions and an organic compound (X) capable of forming an inclusion compound with cerium ions;

(b) an inclusion compound (Y) comprising the organic compound (X) including cerium ions; and (c) at least one of cerium ions and the organic compound (X), and the inclusion compound (Y).

A membrane-electrode assembly for a fuel cell, which comprises a layer of the above polymer electrolyte membrane, and a catalyst layer containing a catalyst, an electrically conductive material and an ion exchange resin, provided on both sides of the polymer electrolyte membrane.

Since the polymer electrolyte membrane of the present invention has excellent resistance to hydrogen peroxide or peroxide radicals, a polymer electrolyte fuel cell provided with a membrane-electrode assembly having the polymer electrolyte membrane of the present invention is excellent in durability and capable of generating the electric power stably over a long period of time.

Now, the present invention will be described in detail with reference to the preferred embodiments.

The present invention is characterized in that the polymer electrolyte membrane contains any one of the above (a) to (c). That is, it is characterized in that the polymer electrolyte membrane contains both cerium ions and the above organic compound (X), contains the above inclusion compound (Y), or contains at least one of cerium ions and the organic compound (X), and the above inclusion compound (Y). It is unclear whether cerium ions and the organic compound (X) completely form the inclusion compound, whether they merely coexist, or whether they undergo equilibrium reaction of inclusion/dissociation in the membrane. However, it is estimated that the presence of them in the membrane effectively improves resistance of the electrolyte membrane to hydrogen peroxide or peroxide radicals. The cerium ions present in the membrane or the inclusion compound (Y) may be trivalent or tetravalent, and the inclusion compound (Y) may also be trivalent or tetravalent.

In the present invention, an inclusion compound is one type of an addition compound comprising a lattice structure of one type of molecules and other atoms or molecules regularly trapped in a certain proportion in the lattice structure. The lattice structure may have any of the cage shape, the cylinder shape and the layer shape, and particularly an inclusion compound in the cage shape is sometimes called a clathrate compound (edited by Shoji Shida, Morikita Publishing Co., Ltd., 1981, first edition, page 1,518). The organic compound forming an inclusion compound may, for example, be a calixarene (cyclophane), a crown ether or a cyclodextrin.

In the present invention, the organic compound (X) capable of forming an inclusion compound with cerium ions is preferably a crown ether. The crown ether means a crown ether and its derivative having a crown ether structure. Specifically, it may, for example, be a crown ether such as 12-crown-4,15-crown-5 or 18-crown-6, a crown ether derivative such as dibenzo-18-crown-6, dicyclohexano-18-crown-6 or (+)-(18-crown-6)-2,3,11,12-tetracarboxylic acid, or a crown ether other than the above, such as a lariat crown ether having a long chain or a cryptand which is a bicyclic crown.

Such a crown ether is a compound having a ring with a repeating structure of ($-CH_2-CH_2-Y-$) units, and Y is a hetero atom such as O, S, N or P. Such a compound has a capability of trapping cations such as metal ions in the ring and forming an inclusion compound. In the present invention, among such crown ethers, 15-crown-5 or 18-crown-6 is used, and such a crown ether is preferred since cerium ions are easily trapped therein in view of the size of the cerium ions.

In the present invention, the above (a) to (c) may be present in any state in the electrolyte membrane, and they are not necessarily present uniformly in the electrolyte membrane. For example, the above (a) to (c) may be present with a concentration gradient in the thickness direction of the polymer electrolyte membrane, or a layer containing none of the above (a) to (c) may be present in a multilayer structure polymer electrolyte membrane. Therefore, in a case where it is required to increase durability against hydrogen peroxide or peroxide radicals particularly on the anode side, the above (a) to (c) may be contained in the vicinity of the surface to be in contact with the anode at a high concentration or may be contained only in a layer closest to the anode.

A method to obtain the polymer electrolyte membrane of the present invention is not particularly limited, and the following methods may, for example, be mentioned.

(1) A polymer electrolyte membrane having sulfonic acid groups is immersed in a solution containing cerium ions so that the sulfonic acid groups are ion-exchanged with cerium ions, and then the membrane is immersed in a solution containing the organic compound (X) to incorporate the organic compound (X) in the membrane.

(2) A soluble cerium compound is added to a dispersion liquid of a polymer electrolyte having sulfonic acid groups so that the sulfonic acid groups are ion-exchanged with cerium ions, a solution or a solid containing the organic compound (X) is added to the dispersion liquid, and a polymer electrolyte membrane is formed by coating using the obtained liquid.

(3) A cerium salt and the organic compound (X) are reacted in a solvent to form the inclusion compound (Y), and a polymer electrolyte membrane having sulfonic acid groups is immersed in a solution having the inclusion compound (Y) dissolved in a solvent so that the sulfonic acid groups are ion-exchanged with the inclusion compound (Y) to incorporate the inclusion compound (Y) in the membrane.

(4) A cerium salt and the organic compound (X) are reacted in a solvent to form the inclusion compound (Y), the inclusion compound (Y) or its solution is added to a dispersion liquid of a polymer electrolyte having sulfonic acid groups, and a polymer electrolyte membrane is formed by coating using the obtained liquid.

As a coating method in (2) and (4), conventional coating method such as die coating, spin coating, gravure printing or screen printing may be employed.

The cerium ions may be trivalent or tetravalent, and various cerium salts are used to obtain a solution containing cerium ions. Specific examples of a salt containing trivalent cerium ion include cerium(III) acetate ($Ce(CH_3COO)_3 \cdot H_2O$), cerium(III) chloride ($CeCl_3 \cdot 6H_2O$), cerium(III) nitrate ($Ce(NO_3)_3 \cdot 6H_2O$) and cerium(III) sulfate ($Ce_2(SO_4)_3 \cdot 8H_2O$). Specific examples of a salt containing tetravalent cerium ion include cerium(IV) sulfate ($Ce(SO_4)_2 \cdot 4H_2O$), cerium(IV) diammonium nitrate ($Ce(NH_4)_2(NO_3)_6$) and cerium(IV) tetraammonium nitrate ($Ce(NH_4)_4(NO_3) \cdot 4H_2O$). In addition, examples of an organic metal complex salt of cerium include cerium(III) acetylacetonate ($Ce(CH_3COCHCOCH_3)_3 \cdot 3H_2O$).

Hereinafter, the inclusion compound (Y) formed by reaction of cerium ions with the crown ether will be represented as a cerium/crown ether inclusion compound or (Ce/Crown)$^{n+}$.

In a case where the cerium/crown ether inclusion compound is a trivalent, when the sulfonic acid groups are ion-exchanged with the cerium/crown ether inclusion compound, it is considered that the cerium/crown ether inclusion compound or (Ce/Crown)$^{3+}$ is bonded to three $-SO_3^-$ as shown below:

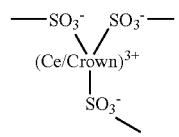

The polymer electrolyte membrane of the present invention has excellent resistance to hydrogen peroxide or peroxide radicals. The reason is not necessarily clear, but it is estimated as follows. By the electrolyte membrane containing cerium ions and the organic compound (X), at least part of them form the inclusion compound (Y), which interacts with sulfonic acid groups ($-SO_3^-$), whereby part of the sulfonic acid groups are ion-exchanged with the inclusion compound (Y) to form the above structure, thus effectively improving resistance of the polymer electrolyte membrane to hydrogen peroxide or hydrogen radicals. It is estimated that the same applies to a case where a preliminarily produced inclusion compound (Y) is incorporated in the electrolyte membrane.

In the present invention, the polymer electrolyte membrane contains cerium ions and the organic compound (X) in a total amount of preferably from 0.5 to 80 mass % based on the polymer electrolyte membrane. Here, the inclusion compound (Y) is regarded as a mixture of them. That is, in a case where cerium ions and the organic compound (X) are separately or as a mere mixture are blended in the polymer electrolyte, the amount of the inclusion compound (Y) is not considered even if it is formed in the polymer electrolyte, and only the total amount of cerium ions and the organic compound (X) blended is calculated. Further, in a case where the inclusion compound (Y) is preliminarily formed and then incorporated in the polymer electrolyte, the amount of the inclusion compound (Y) is considered as the total amount of cerium ions and the organic compound (X) forming the inclusion compound (Y). Further, in a case where cerium ions and the organic compound (X) not forming the inclusion compound (Y) are present in addition to cerium ions and the organic compound (X) forming the inclusion compound (Y), their amounts are also calculated.

The total content of cerium ions and the organic compound (X) is more preferably from 1 to 60 mass %, furthermore preferably from 2 to 50 mass %. If the total content of cerium ions and the organic compound (X) is lower than the above range, no sufficient stability against hydrogen peroxide or peroxide radicals may be secured. Further, if the total content of cerium ions and the organic compound (X) is higher than the above range, no sufficient electrical conductivity of hydrogen ions may be secured, thus increasing the membrane resistance to lower power generation properties.

In the present invention, the relative ratio of the organic compound (X) to cerium ions contained in the polymer electrolyte membrane is preferably such that the amount of the organic compound (X) is from 0.2 to 1.2 mole per mole of cerium ions. In the same manner as above, the inclusion compound (Y) is regarded as a mixture of them. The inclusion compound (Y) is usually a reaction product of one cerium ion with one molecule of the organic compound (X). Therefore, in a case where the amount of the organic compound (X) is not 1 mole per mole of cerium ions, it is considered that either cerium ions or the organic compound (X) in an excessive amount is contained in the polymer electrolyte membrane without forming the inclusion compound (Y). However, it is unclear as mentioned above whether or not cerium ions and the organic compound (X) in the polymer electrolyte membrane form the inclusion compound (Y) in fact.

In the present invention, the polymer electrolyte having sulfonic acid groups before incorporation of any one of the above (a) to (c) is not particularly limited, but its ion exchange capacity is preferably from 0.5 to 3.0 meq/g dry resin, particularly preferably from 0.7 to 2.5 meq/g dry resin. If the ion exchange capacity is less than 0.5 meq/g dry resin, no satisfactory conductivity of ions will be secured, and if the ion exchange capacity exceeds 3.0 meq/g dry resin, the polymer electrolyte will be gelated, and it can not be formed into a membrane. The ion exchange capacity is particularly preferably from 1.0 to 2.5 meq/g dry resin.

Further, from the viewpoint of durability, the polymer electrolyte is preferably a fluoropolymer, particularly preferably a perfluorocarbon polymer (which may contain an etheric oxygen atom). Namely, the polymer electrolyte is preferably a sulfonic acid group-containing perfluorocarbon polymer. The perfluorocarbon polymer is not particularly limited but is preferably a perfluorocarbon polymer having a sulfonic acid group-containing side chain represented by —(OCF$_2$CFX)$_m$—O$_p$—(CF$_2$)$_n$—SO$_3$H (wherein m is an integer of from 0 to 3, n is an integer of from 1 to 12, p is 0 or 1, and X is a fluorine atom or a trifluoromethyl group).

The sulfonic acid group-containing perfluorocarbon polymer is obtained usually by copolymerizing a perfluorovinyl compound having a —SO$_2$F group and another perfluorovinyl compound to produce a copolymer having —SO$_2$F groups, and converting the —SO$_2$F groups in the copolymer to sulfonic acid groups. Accordingly, the above perfluorocarbon polymer having a sulfonic acid group-containing side chain is obtained by copolymerizing a perfluorovinyl compound represented by CF$_2$=CF—(OCF$_2$CFX)$_m$—O$_p$—(CF$_2$)$_n$—SO$_2$F (wherein m, n, p and X are as defined above) with another perfluorovinyl compound (particularly preferably tetrafluoroethylene), and converting —SO$_2$F groups in the obtained copolymer to —SO$_3$H groups.

Specific preferred examples of the above perfluorovinyl compound include compounds represented by the following formulae (i) to (iii). In the following formulae, q is an integer of from 1 to 8, r is an integer of from 1 to 8, and t is an integer of from 1 to 3:

$$CF_2=CFO(CF_2)_q-SO_2F \quad (i)$$

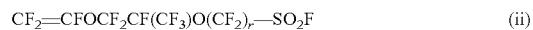

$$CF_2=CFOCF_2CF(CF_3)O(CF_2)_r-SO_2F \quad (ii)$$

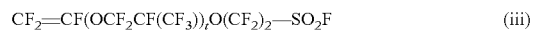

$$CF_2=CF(OCF_2CF(CF_3))_tO(CF_2)_2-SO_2F \quad (iii)$$

In a case where a perfluorocarbon polymer having sulfonic acid groups is used, the terminal of the polymer is preferably stabilized. When the terminal of the polymer is stabilized, the polymer electrolyte will be more excellent in stability against hydrogen peroxide or peroxide radicals and thereby has improved durability. As a method of stabilizing the terminal, preferred is a method of copolymerizing a perfluorovinyl compound with another perfluorovinyl compound, followed by fluorination with e.g. fluorine.

Further, the polymer electrolyte in the present invention may be a polymer having sulfonic acid group, other than a perfluorocarbon polymer having sulfonic acid groups. For example, a polymer having such a structure that it has an aromatic ring in the main chain of the polymer or in both the main chain and side chains, and that sulfonic acid groups are introduced to the aromatic ring, and having an ion exchange capacity of from 0.8 to 3.0 meq/g dry resin, may be preferably used.

Specific examples include sulfonated polyarylene, sulfonated polybenzoxazole, sulfonated polybenzothiazole, sulfonated polybenzoimidazole, sulfonated polysulfone, sulfonated polyether sulfone, sulfonated polyether ether sulfone, sulfonated polyphenylene sulfone, sulfonated polyphenylene oxide, sulfonated polyphenylene sulfoxide, sulfonated polyphenylene sulfide, sulfonated polyphenylene sulfide sulfone, sulfonated polyether ketone, sulfonated polyether ether ketone, sulfonated polyether ketone, and sulfonated polyimide.

The electrolyte membrane of the present invention may contain another component in addition to the polymer electrolyte and the above (a) to (c). Such another component may, for example, be a reinforcing material made of fibers, woven cloth, non-woven cloth or a porous material of a resin such as a polytetrafluoroethylene or a perfluoroalkyl ether. Even in the case of a membrane reinforced by a reinforcing material, the above (a) to (c) can be incorporated in the electrolyte membrane in the same manner as above. For example, the electrolyte membrane of the present invention can be obtained by immersing a reinforced electrolyte membrane in a solution containing cerium ions and then incorporating cerium ions and the organic compound (X) in the membrane by the above method (1). Further, the electrolyte membrane of the present invention can be obtained also by a method of preparing a membrane by using a dispersion liquid containing cerium ions, the organic compound (X) and a polymer electrolyte, together with a reinforcing material.

The present invention further provides a membrane-electrode assembly for a fuel cell, which comprises a layer of the above polymer electrolyte membrane. Such a membrane-electrode assembly is a membrane-electrode assembly for a fuel cell, which comprises a layer of the polymer electrolyte membrane, and a catalyst layer containing a catalyst, an electrically conductive material and an ion exchange resin, provided on both sides of the polymer electrolyte membrane. Preferably, the membrane-electrode assembly further has a gas diffusion layer outside the both catalyst layers.

The membrane-electrode assembly of the present invention is a membrane-electrode assembly comprising, on both sides of the above electrolyte membrane of the present invention, a catalyst layer containing a catalyst, an electrically conductive material and an ion exchange resin. The two catalyst layers function as an anode and a cathode. Each of the anode and the cathode of the membrane-electrode assembly preferably has a gas diffusion layer made of a porous electrically conductive sheet outside of each catalyst layer (the side opposite to the membrane). The porous electrically conductive sheet is preferably a carbon fiber sheet made of carbon cloth, carbon paper or the like. The polymer electrolyte fuel cell usually has such a structure that separators having grooves formed to constitute paths for a fuel gas or an oxidizing agent gas are disposed on both sides of the membrane-electrode assembly, and a plurality of such membrane-electrode assemblies are stacked with the separators to form a stack. A hydrogen gas is supplied to the anode side of the polymer electrolyte fuel cell, and an oxygen gas or air is supplied to the cathode. A reaction of $H_2 \rightarrow 2H^+ + 2e^-$ takes place on the anodes, and a reaction of $\frac{1}{2}O_2 + 2H^+ + 2e^- \rightarrow H_2O$ on the cathodes, whereby chemical energy is converted to electric energy. Further, the electrolyte membrane and the membrane-electrode assembly of the present invention are also applicable to direct methanol fuel cells in which methanol is supplied instead of the fuel gas to the anode side.

The above-mentioned membrane-electrode assembly may be obtained in accordance with conventional methods, by mixing a catalyst, an electrically conductive material and a solution of an ion exchange resin to obtain a uniform dispersion liquid, and forming a gas diffusion electrode (an electrode having a catalyst layer and a gas diffusion layer stacked) by any of the following methods. The catalyst is preferably platinum catalyst fine particles or platinum alloy catalyst fine particles, and the electrically conductive material is preferably a carbon type electrically conductive material such as carbon black. The catalyst fine particles are used usually as supported on the electrically conductive material.

The first method is a method of coating the both surfaces of the electrolyte membrane with the above-mentioned dispersion liquid, drying it, and then attaching two carbon fiber sheets closely onto the both sides. The second method is a method of applying the above-mentioned dispersion liquid onto two carbon fiber sheets, drying it, and then placing the two sheets on both sides of the above electrolyte membrane so that the surfaces coated with the dispersion liquid is close in contact with the electrolyte membrane. The carbon fiber sheets herein function as gas diffusion layers to more uniformly diffuse the gas to the catalyst-containing layers, and functions as current collectors. Furthermore, another available method is such that a substrate separately prepared is coated with the above-mentioned dispersion liquid to make a catalyst layer, such catalyst layers are bonded to an electrolyte membrane by a method such as transcription, then the substrate is peeled off, and the electrolyte membrane is sandwiched between the above-mentioned carbon fiber sheets.

The ion-exchange resin contained in the catalyst layer is not particularly limited, and it is preferably the above-described perfluorocarbon polymer having sulfonic acid groups. The ion-exchange resin in the catalyst layer may contain any one of the above (a) to (c) just like the electrolyte membrane of the present invention. For example, an ion-exchange resin containing cerium ions and the organic compound (X) can be applied to both anodes and cathodes, and decomposition of the resin can be effectively suppressed, so as to further enhance the durability of the polymer electrolyte fuel cell.

In a case where any one of the above (a) to (c) is to be incorporated in both the ion exchange resin in the catalyst layer and the electrolyte membrane, any one of the above (a) to (c) may be incorporated after the catalyst layer and the electrolyte membrane are combined. For example, it is possible to preliminarily prepare an assembly of a catalyst layer and an electrolyte membrane, and to incorporate cerium ions and the organic compound (X) to the ion exchange resin in the catalyst layer and the electrolyte membrane by the above method (1).

Now, the present invention will be described in further detail with reference to Examples of the invention (Examples 1 and 2) and Comparative Examples (Examples 3 to 5). However, it should be understood that the present invention is by no means restricted to such specific Examples. A perfluorocarbon polymer having sulfonic acid groups used in Examples and Comparative Examples is a polymer obtained by copolymerizing $CF_2=CF_2$ with $CF_2=CFOCF_2CF(CF_3)O(CF_2)_2SO_2F$ to obtain a copolymer and converting $—SO_2F$ groups in the copolymer to $—SO_3H$. Further, abbreviations are as follows.

PTFE: Polytetrafluoroethylene
ETFE: An ethylene/tetrafluoroethylene copolymer

EXAMPLE 1

300 g of a perfluorocarbon polymer having sulfonic acid groups (ion exchange capacity: 1.1 meq/g dry resin), 420 g of ethanol and 280 g of water were charged in a 2 L autoclave, sealed hermetically and stirred by a double helical blade at 105° C. for 6 hours to obtain a uniform liquid (hereinafter referred to as solution A). The solid content concentration of solution A was 30 mass %.

100 g of solution A and 1.00 g of cerium carbonate hydrate $(Ce_2(CO_3)_3 \cdot 8H_2O)$ were charged into a 300 ml round-bottomed flask made of glass and stirred at room temperature for 8 hours by a meniscus blade made of PTFE. Bubbles due to generation of $CO_2$ were generated from the start of stirring, and uniform transparent liquid composition C was finally obtained.

The above composition C was applied to a 100 μm ETFE sheet (AFLEX 100N, tradename, manufactured by Asahi Glass Company, Limited) by cast coating with a die coater, preliminarily dried at 80° C. for 10 minutes and dried at 120° C. for 10 minutes and further annealed at 150° C. for 30 minutes to obtain a polymer electrolyte membrane having a thickness of 50 μm.

From this electrolyte membrane, a membrane having a size of 5 cm×5 cm was cut out and left to stand in dry nitrogen for 16 hours, and then the membrane was ashed and subjected to measurement by ICP spectrometry to quantitatively analyze the amount of cerium in the polymer electrolyte membrane for confirmation and as a result, the amount of cerium was 1.5% which corresponds to the addition amount of cerium carbonate hydrate based on the mass of the membrane.

Then, as a crown ether, 0.87 g of 18-crown-6 manufactured by SIGMA ALDRICH Japan K.K. was added to the above liquid composition C, followed by stirring at room temperature for 24 hours to obtain uniform transparent liquid composition D. The solid content concentration of the obtained liquid composition D was 30.9 mass %.

The above composition D was applied to a 100 μm ETFE sheet (AFLEX 100N, tradename, manufactured by Asahi Glass Company, Limited) by cast coating with a die coater, preliminarily dried at 80° C. for 10 minutes and dried at 120° C. for 10 minutes and further annealed at 150° C. for 30 minutes to obtain a polymer electrolyte membrane having a thickness of 50 μm.

Here, since the content of 0.87 g of 18-crown-6 added to prepare the above-described liquid composition D in the membrane corresponds to 2.8% based on the mass of the membrane, it was found that 1.5% of cerium and 2.8% of 18-crown-6, i.e. totally 4.3% of them are contained based on the mass of the membrane.

Then, 5.1 g of distilled water was mixed with 1.0 g of a carbon black powder having platinum fine particles supported on a carbon black carrier (specific surface area: 800 $m^2/g$) (amount of platinum fine particles supported: 50%, manufactured by N.E. CHEMCAT CORPORATION). With this liquid mixture, 5.6 g of a liquid having a perfluorocarbon polymer having sulfonic acid groups (ion exchange capacity: 1.1 meq/g dry resin) dispersed in ethanol, having a solid content concentration of 9 mass %, was mixed. This mixture was homogenized by using a homogenizer (Polytron, tradename, manufactured by Kinematica Company) to prepare coating fluid E for forming a catalyst layer.

This coating fluid E was applied on a substrate film made of polypropylene with a bar coater, and dried in a dryer at 80° C. for 30 minutes to prepare a catalyst layer. The amount of platinum per unit area contained in the catalyst layer was calculated by measuring the mass of the substrate film alone before formation of a catalyst layer and the mass of the substrate film after formation of the catalyst layer and as a result, it was 0.5 $mg/cm^2$.

Then, using the above-described polymer electrolyte membrane containing cerium and 18-crown-6, the above catalyst layers formed on the substrate film were disposed on both sides of the membrane and transferred by hot press method to obtain a membrane-catalyst layer assembly having an anode catalyst layer and a cathode catalyst layer bonded to both sides of the polymer electrolyte membrane. The electrode area was 16 $cm^2$.

This membrane-catalyst layer assembly was interposed between two gas diffusion layers made of carbon cloth having a thickness of 350 μm to prepare a membrane-electrode assembly, which was assembled into a cell for power generation, and an open circuit voltage test (OCV test) was carried out as an accelerated test. In the test, hydrogen (utilization ratio: 70%) and air (utilization ratio: 40%) corresponding to a current density of 0.2 $A/cm^2$ were supplied under ambient pressure to the anode and to the cathode, respectively, the cell temperature was set at 90° C., the dew point of the anode gas was set at 60° C. and the dew point of the cathode gas was set at 60° C., the cell was operated for 100 hours in an open circuit state without generation of electric power, and a voltage change was measured during the period. Furthermore, by supplying hydrogen to the anode and nitrogen to the cathode, amounts of hydrogen gas having leaked from the anode to the cathode through the membrane were analyzed before and after the test, thereby to check the degree of degradation of the membrane. The results are shown in Table 1.

Then, a membrane-electrode assembly was prepared and assembled into a cell for power generation in the same manner as above, and a durability test under operation conditions under low humidification was carried out. The test conditions were as follows. Hydrogen (utilization ratio: 70%)/air (utilization ratio: 40%) was supplied under ambient pressure at a cell temperature of 80° C. and at a current density of 0.2 $A/cm^2$, and the polymer electrolyte fuel cell was evaluated as to the initial property and durability. Hydrogen and air were so humidified and supplied into the cell that the dew point on the anode side was 80° C. and that the dew point on the cathode side was 50° C., respectively, whereupon the cell voltage at the initial stage of the operation and the relation between the elapsed time after the initiation of the operation and the cell voltage were measured. The results are shown in Table 2. In addition, the cell voltage at the initial stage of the operation and the relation between the elapsed time after the initiation of the operation and the cell voltage were also measured in the same manner as above under the above cell evaluation conditions except that the dew point on the cathode side was changed to 80° C. The results are shown in Table 3.

Then, a membrane-electrode assembly was prepared and assembled into a cell for power generation in the same manner, and a durability test under operation conditions under low humidification at 120° C. was carried out. The test conditions were as follows. The anode and the cathode were pressurized under 200 kPa, hydrogen (utilization ratio: 50%)/air (utilization ratio: 50%) was supplied at a cell temperature of 120° C. and at a current density of 0.2 $A/cm^2$, and the polymer electrolyte fuel cell was evaluated as to the initial property and durability. Hydrogen and air were so humidified and supplied into the cell that the dew point on the anode side was 100° C. and that the dew point on the cathode side was 100° C., respectively, whereupon the cell voltage at the initial stage of the operation and the relation between the elapsed time after the initiation of the operation and the cell voltage were measured. The results are shown in Table 4.

EXAMPLE 2

Using uniform transparent liquid composition C prepared in the same manner as in Example 1, 0.73 g of 15-crown-5 manufactured by SIGMA ALDRICH Japan K.K. as a crown ether in an equimolar amount to cerium in the cerium carbonate hydrate was added to the above uniform transparent liquid composition C, followed by stirring at room temperature for 24 hours to obtain uniform transparent liquid composition F. Then, in the same manner as in Example 1, it was found that the total mass of cerium and 15-crown-5 was 3.9% based on the membrane.

Then, a polymer electrolyte membrane having a thickness of 50 μm was prepared in the same manner as in Example 1 except that the above liquid composition F was used, and electrode layers were bonded to the membrane in the same manner as in Example 1 to prepare a membrane-electrode assembly, and the same evaluations as in Example 1 were carried out. The results are shown in Tables 1 to 4.

EXAMPLE 3

As a polymer electrolyte membrane, an ion exchange membrane having a thickness of 50 μm, made of a perfluorocarbon polymer having sulfonic acid groups (ion exchange capacity: 1.1 meq/g dry resin) in a size of 5 cm×5 cm (area: 25 $cm^2$) was used. The weight of the entire membrane after left to stand in dry nitrogen for 16 hours was measured in dry nitrogen and was 0.251 g. The amount of sulfonic acid groups in the membrane is determined in accordance with the following formula:

0.251×1.1 (1.1 meq/g dry resin)=0.276 (meq).

Then, 24.0 mg of cerium(III) nitrate ($Ce(NO_3)_3 \cdot 6H_2O$) was dissolved in 500 ml of distilled water so that cerium ions (trivalent) in an amount corresponding to 60% of the amount of sulfonic acid groups in the membrane were contained, and the above ion exchange membrane was immersed in the solution, followed by stirring with a stirrer at room temperature for 40 hours so that part of sulfonic acid groups in the ion exchange membrane were ion-exchanged with cerium ions. The cerium(III) nitrate solution before and after the immersion was analyzed by ion chromatography and as a result, the ion exchange rate of the ion exchange membrane with cerium ions (the ratio of $-SO_3^-$ groups exchanged with cerium ions to the total number of $-SO_3^-$ groups originally present in the membrane) was found to be 58%. The cerium content in the membrane was 2.94 mass %. The membrane was immersed in a 1 mol/L phosphoric acid aqueous solution at room temperature for 60 hours and as a result, precipitation of cerium phosphate in the membrane was confirmed by X-ray diffraction. Then, using the membrane, electrode layers were bonded to the membrane in the same manner as in Example 1 to prepare a membrane-electrode assembly, and the same evaluations as in Example 1 were carried out. The results are shown in Tables 1 to 4.

EXAMPLE 4

100 g of solution A and 0.87 g of 18-crown-6 manufactured by SIGMA ALDRICH Japan K.K. were charged into a 300 ml round-bottomed flask made of glass and stirred at room temperature for 24 hours by a meniscus blade made of PTFE to obtain uniform transparent liquid composition F. The obtained composition F was applied to a 100 μm ETFE sheet (AFLEX 100N, tradename, manufactured by Asahi Glass Company, Limited) by cast coating with a die coater, preliminarily dried at 80° C. for 10 minutes and dried at 120° C. for 10 minutes and further annealed at 150° C. for 30 minutes to obtain a polymer electrolyte membrane having a thickness of 50 μm.

Then, using the membrane, electrode layers were bonded to the membrane in the same manner as in Example 1 to prepare a membrane-electrode assembly, and the same evaluations as in Example 1 were carried out. The results are shown in Tables 1 to 4.

EXAMPLE 5

Using, as a polymer electrolyte membrane, the same ion exchange membrane as used in Example 3 without any treatment, a membrane-electrode assembly was prepared in the same manner as in Example 1. With respect to the membrane-electrode assembly, the same evaluations as in Example 1 were carried out. The results are shown in Tables 1 to 4.

TABLE 1

|  | Open circuit voltage (V) | | Hydrogen leak (ppm) | |
| --- | --- | --- | --- | --- |
|  | Initial | After 100 hrs | Initial | After 100 hrs |
| Example 1 | 0.99 | 0.98 | 700 | 720 |
| Example 2 | 0.99 | 0.99 | 700 | 710 |
| Example 3 | 0.98 | 0.90 | 730 | 4000 |
| Example 4 | 0.93 | 0.60 | 900 | 25000 |
| Example 5 | 0.94 | 0.51 | 1000 | 40000 |

TABLE 2

|  | Initial output voltage (V) | Durability/output voltage (V) | |
| --- | --- | --- | --- |
|  |  | After 500 hrs | After 2000 hrs |
| Example 1 | 0.77 | 0.77 | 0.76 |
| Example 2 | 0.77 | 0.76 | 0.76 |
| Example 3 | 0.73 | 0.72 | 0.70 |
| Example 4 | 0.73 | 0.62 | 0.55 |
| Example 5 | 0.73 | 0.58 | 0.50 |

TABLE 3

|  | Initial output voltage (V) | Durability/output voltage (V) | |
| --- | --- | --- | --- |
|  |  | After 500 hrs | After 2000 hrs |
| Example 1 | 0.78 | 0.78 | 0.78 |
| Example 2 | 0.78 | 0.78 | 0.77 |
| Example 3 | 0.75 | 0.73 | 0.72 |
| Example 4 | 0.74 | 0.70 | 0.64 |
| Example 5 | 0.72 | 0.60 | 0.55 |

TABLE 4

|  | Initial output voltage (V) | Durability/output voltage (V) | |
| --- | --- | --- | --- |
|  |  | After 500 hrs | After 2000 hrs |
| Example 1 | 0.77 | 0.73 | 0.68 |
| Example 2 | 0.77 | 0.74 | 0.69 |
| Example 3 | 0.68 | 0.62 | Power generation impossible |
| Example 4 | 0.73 | Power generation impossible | Power generation impossible |
| Example 5 | 0.73 | Power generation impossible | Power generation impossible |

It was confirmed from the above results of Examples and Comparative Examples that the open circuit voltage test (OCV test) under high temperature and low humidification conditions as an acceleration test resulted in deterioration of the conventional electrolyte membranes and increase of hydrogen leak due to hydrogen peroxide or peroxide radials formed on the anode and the cathode, but exhibited the dramatically excellent durability of the electrolyte membrane of the present invention.

The electrolyte membrane of the present invention is very excellent in durability against hydrogen peroxide or peroxide radicals formed by power generation of a fuel cell. Accordingly, a polymer electrolyte fuel cell provided with a membrane-electrode assembly having the electrolyte membrane of the present invention has durability over a long period of time either in power generation under low humidification and in power generation under high humidification.

The entire disclosure of Japanese Patent Application No. 2006-316308 filed on Nov. 22, 2006 including specification, claims and summary is incorporated herein by reference in its entirety.

What is claimed is:

1. A polymer electrolyte membrane which comprises a polymer electrolyte having sulfonic acid groups, and contains at least one of the following (a), (b), (c1), (c2) and (c3):
   (a) cerium ions and an organic compound (X) capable of forming an inclusion compound with cerium ions, wherein the organic compound (X) is a calixerene, crown ether or cyclodextrin,
(b) an inclusion compound (Y) comprising the organic compound (X) and cerium ions,
(c1) cerium ions and the inclusion compound (Y),
(c2) the organic compound (X) and the inclusion compound (Y), and
(c3) cerium ions, the organic compound (X) and the inclusion compound (Y).

2. The polymer electrolyte membrane according to claim 1, wherein the organic compound (X) is a crown ether.

3. The polymer electrolyte membrane according to claim 2, Wherein the crown ether is at least one crown ether selected from the group consisting of 15-crown-5, 18-crown-6 and an organic compound having such a structure in its molecule.

4. The polymer electrolyte membrane according to claim 1, which contains cerium ions and the organic compound (X) (provided that the inclusion compound (Y) is regarded as a mixture of them) in a total amount of from 0.5 to 80 mass %.

5. The polymer electrolyte membrane according to claim 2, which contains cerium ions and the organic compound (X) (provided that the inclusion compound (Y) is regarded as a mixture of them) in a total amount of from 0.5 to 80 mass %.

6. The polymer electrolyte membrane according to claim 3, which contains cerium ions and the organic compound (X) (provided that the inclusion compound (Y) is regarded as a mixture of them) in a total amount of from 0.5 to 80 mass %.

7. The polymer electrolyte membrane according to claim 1, which contains the organic compound (X) in a ratio of from 0.2 to 1.2 mole per mole of the cerium ions (provided that the inclusion compound (Y) is regarded as a mixture of them).

8. The polymer electrolyte membrane according to claim 2, which contains the organic compound (X) in a ratio of from 0.2 to 1.2 mole per mole of the cerium ions (provided that the inclusion compound (Y) is regarded as a mixture of them).

9. The polymer electrolyte membrane according to claim 3, which contains the organic compound (X) in a ratio of from 0.2 to 1.2 mole per mole of the cerium ions (provided that the inclusion compound (Y) is regarded as a mixture of them).

10. The polymer electrolyte membrane according to claim 4, which contains the organic compound (X) in a ratio of from 0.2 to 1.2 mole per mole of the cerium ions (provided that the inclusion compound (Y) is regarded as a mixture of them).

11. The poly er electrolyte membrane according to claim 5, which contains the organic compound (X) in a ratio of from 0.2 to 1.2 mole per mole of the cerium ions (provided that the inclusion compound (Y) is regarded as a mixture of them).

12. The polymer electrolyte membrane according to claim 6, which contains the organic compound (X) in a ratio of from 0.2 to 1.2 mole per mole of the cerium ions (provided that the inclusion compound (Y) is regarded as a mixture of them).

13. The polymer electrolyte membrane according to claim 1, wherein the polymer electrolyte is a sulfonic acid group-containing perfluorocarbon polymer.

14. The polymer electrolyte membrane according to claim 2, wherein the polymer electrolyte is a sulfonic acid group-containing perfluorocarbon polymer.

15. The polymer electrolyte membrane according to claim 3, wherein the polymer electrolyte is a sulfonic acid group-containing perfluorocarbon polymer.

16. The poly er electrolyte membrane according to claim 4, wherein the polymer electrolyte is a sulfonic acid group-containing perfluorocarbon polymer.

17. The polymer electrolyte membrane according to claim 5, wherein the polymer electrolyte is a sulfonic acid group-containing perfluorocarbon polymer.

18. The polymer electrolyte membrane according to claim 6, wherein the polymer electrolyte is a sulfonic acid group-containing perfluorocarbon polymer.

19. The polymer electrolyte membrane according to claim 7, wherein the polymer electrolyte is a sulfonic acid group-containing perfluorocarbon polymer.

20. The polymer electrolyte membrane according to claim 8, wherein the polymer electrolyte is a sulfonic acid group-containing perfluorocarbon polymer.

21. The polymer electrolyte membrane according to claim 9, wherein the polymer electrolyte is a sulfonic acid group-containing perfluorocarbon polymer.

22. The polymer electrolyte membrane according to claim 10, wherein the polymer electrolyte is a sulfonic acid group-containing perfluorocarbon polymer.

23. The polymer electrolyte membrane according to claim 11, wherein the polymer electrolyte is a sulfonic acid group-containing perfluorocarbon polymer.

24. A membrane-electrode assembly for a fuel cell, which comprises a layer of a polymer electrolyte membrane Which comprises a polymer electrolyte having sulfonic acid groups and contains at least one of the following (a), (b), (c1), (c2) and (c3), and a catalyst layer containing a catalyst, an electrically conductive material and an ion exchange resin, provided on both sides of the polymer electrolyte membrane:
(a) cerium ions and an organic compound (X) capable of forming an inclusion compound with cerium ions,
wherein the organic compound (X) is a calixerene, crown ether or cyclodextrin,
(b) an inclusion compound comprising the organic compound (X) and cerium ions,
(c1) cerium ions and the inclusion compound (Y),
(c2) the organic compound (X) and the inclusion compound (Y), and
(c3) cerium ions, the organic compound (X) and the inclusion compound (Y).

25. The membrane-electrode assembly for a fuel cell according to claim 24, wherein the organic compound (X) is a crown ether.

26. The membrane-electrode assembly for a fuel cell according to claim 25, wherein the crown ether is at least one crown ether selected from the group consisting of 15-crown-5, 18-crown-6 and an organic compound having such a structure in its molecule.

27. The membrane-electrode assembly for a fuel cell according to claim 24, which further has a gas diffusion layer outside the both catalyst layers.

28. The membrane-electrode assembly for a fuel cell according to claim 25, which further has a gas diffusion layer outside the both catalyst layers.

29. The membrane-electrode assembly for a fuel cell according to claim 26, which further has a gas diffusion layer outside the both catalyst layers.

30. The polymer electrolyte membrane according to claim 1, which comprises (a).

31. The polymer electrolyte membrane according to claim 1, which comprises (b).

32. The polymer electrolyte membrane according to claim 1, which comprises (c1).

33. The polymer electrolyte membrane according to claim 1, which comprises (c2).

34. The polymer electrolyte membrane according to claim 1, which comprises (c3).

35. The membrane-electrode assembly for a fuel cell according to claim 24, wherein the polymer electrolyte membrane comprises (a).

36. The membrane-electrode assembly for a fuel cell according to claim 24, wherein the polymer electrolyte membrane comprises (b).

37. The membrane-electrode assembly for a fuel cell according to claim 24, wherein the polymer electrolyte membrane comprises (c1).

38. The membrane-electrode assembly for a fuel cell according to claim 24, wherein the polymer electrolyte membrane comprises (c2).

39. The membrane-electrode assembly for a fuel cell according to claim 24, wherein the polymer electrolyte membrane comprises (c3).

40. The polymer electrolyte membrane according to claim 1, wherein the inclusion compound (Y) is trivalent or tetravalent.

41. The membrane-electrode assembly for a fuel cell according to claim 24, wherein the inclusion compound (Y) is trivalent or tetravalent.

* * * * *